Aug. 16, 1949.  J. HORTON-WELLINGS  2,479,493
APPARATUS FOR REPAIRING TIRE BEADS
Filed Sept. 4, 1945  2 Sheets-Sheet 1

Joseph Horton-Wellings
INVENTOR
By Walker Sunn
ATTORNEY

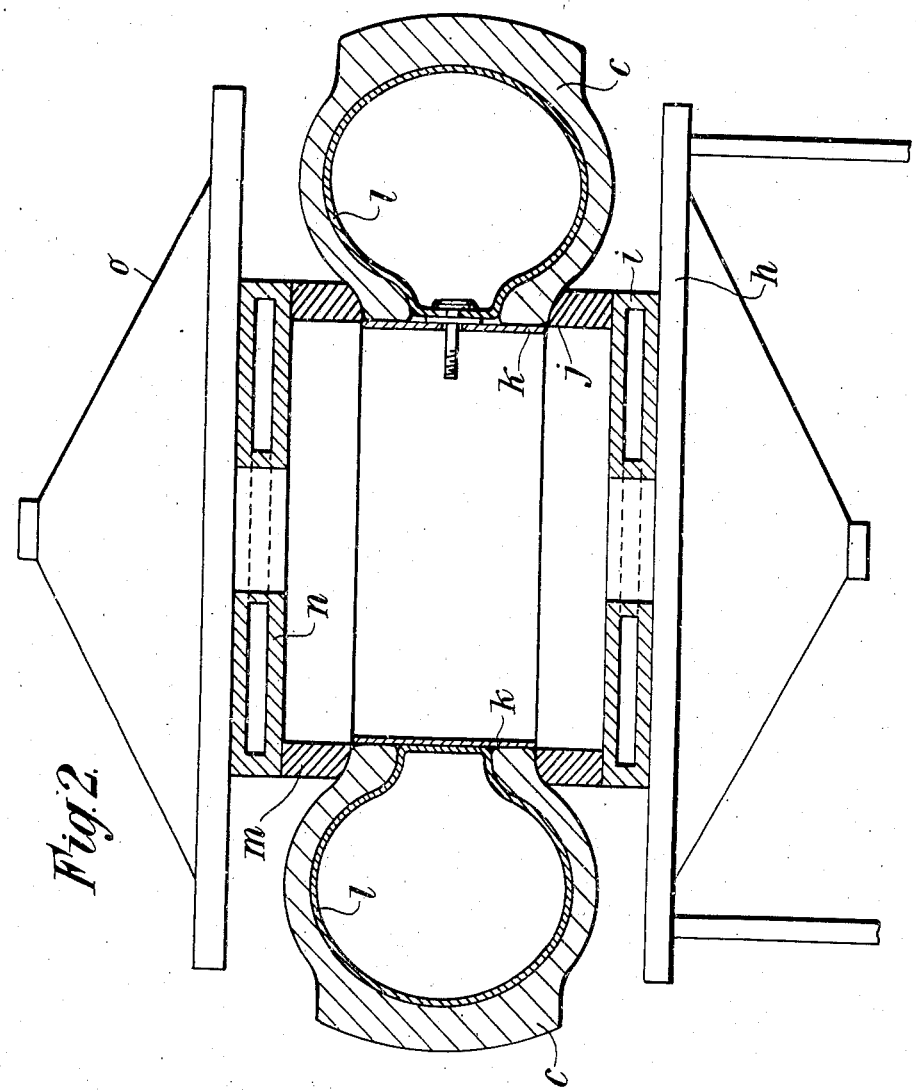

Patented Aug. 16, 1949

2,479,493

UNITED STATES PATENT OFFICE 2,479,493

APPARATUS FOR REPAIRING TIRE BEADS

Joseph Horton-Wellings, Market Drayton, England

Application September 4, 1945, Serial No. 614,228
In Great Britain September 9, 1944

5 Claims. (18—18)

It is generally known that many pneumatic tyres for mechanically propelled vehicles, whilst otherwise sound, are unusable due to damage to the bead portions of the tyre, Such damage may be due to wear on a rusty or distorted rim or to misuse in fitting or removing the tyre.

Hitherto such repairs to beads have been effected in a sectional repair mould, or by sectional vise type mould, but such methods tend to distort the tyre and bead and also are open to abuse in that the repairs may be effected at the discretion of the operator in sectional moulds only approximating to the correct shape of the tyre or tyre bead. Another disadvantage is that only a relatively small portion of the bead may be treated at any one time.

The object of the present invention is an improved method of and means for repairing the beads of pneumatic tyres.

In the accompanying drawings—

Fig. 2 is a cross section showing an alternative form of apparatus; and

Figures 1, 3:
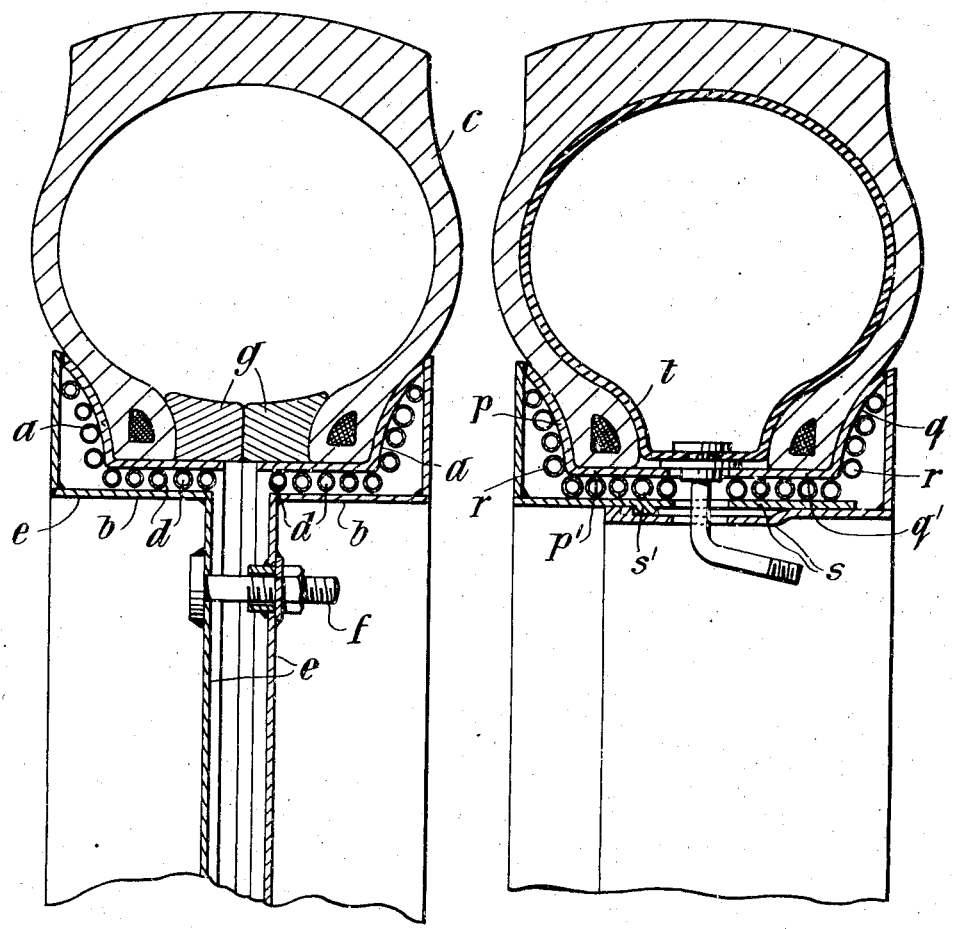
Fig. 1 is a cross section showing one example of an apparatus for carrying out the aforesaid method of the invention.
Fig. 3 is a cross section showing a further form of apparatus.

In the example of the apparatus shown in Fig. 1, there are two full circle rim parts, each having a flange $a$ and base $b$ together adapted to hold the tyre $c$. Against the underside of each rim part are heating tubes $d$. Each rim part is located in the angle of a flanged disc $e$, which discs are arranged back to back and adapted to be clamped together by bolts $f$. By constructing the rim parts separated from the discs the same rims may be used for different widths of tyre. Located between the beads of the tyre is a two-part spacer $g$ against which beads may be clamped and the provision of such spacer in two parts enables additional spacing rings to be inserted when dealing with a wider tyre. The clamping means enables the necessary pressure to be applied to the tyre bead between the flange $a$ and the spacing piece $g$.

In Fig. 2 the apparatus includes a table $h$ on which is a circular steam hot plate $i$ on which is supported a bead forming rim $j$. The tyre $c$ is mounted on a flat base ring $k$ and has an inner tube or air bag $l$ for inflation. The upper bead is adapted to be treated by a bead forming rim $m$ heated by a hot plate $n$ similar to the rim $j$ and plate $i$ whilst a heavy pressure platen $o$ is provided over the whole assembly. Preferably, the wall of the tyre is supported from the table during the heat treatment to prevent distortion. Inflation of the air bag $l$ provides the necessary moulding pressure on the bead. An inflatable air bag may be substituted for the inner mould member.

In the example shown in Fig. 3 the construction is substantially as shown in Fig. 1 and comprises full circle rim parts $p$ and $q$ with bases $p'$ and $q'$ and heating tubes $r$ for each. These rim parts are adapted to be clamped together by external flange members $s$ arranged back to back and segmental interlocking by lugs at $s'$ with rotational movement. An inflatable bag $t$ is located within the tyre which provides the required lateral pressure of the beads against the rim parts $p$ and $q$.

If it is desired to vulcanize the inside surface of the bead toe, the spacing ring may be shaped to give the desired contour and be of heat conducting material. The heat may be obtained by conduction from the heated rim or the spacer itself may be heated by any suitable means.

The heated outer mould parts of the apparatus may be loose flanges conforming to the outer surfaces of tyre beads, cast as cavity moulds or having steam chambers built on to them by welding or having steam tubing secured to the outer surfaces of the flanges. Alternatively the heat may be supplied by suitable electrical means. These flanges may be held in contact under pressure with the tyre beads by fitting an inner tube and quick fitting type rim to the tyre and inflating, or by mechanical means.

In another arrangement of the invention the members in contact with the beads may be of solid construction of aluminum or other suitable heat conducting material, having one face conforming to the contour of the tyre beads and the other flat. The required heat may be applied to the beads by conduction through the bead members from suitably shaped hot plates. Pressure may be obtained by suitable mechanical means or by a combination of mechanical and pneumatic means.

In one arrangement the hot plates and bead members may be contained between the plates of a press or curing table with a suitable collapsible bead spacer between the beads, or an inner tube or air bag may be fitted to the tyre and an annular band fitted between the bead members to form a rim, and the tyre inflated to the required pressure.

What I claim is:

1. Means for repairing the beads of a tire, which comprises a pair of annular outer members having upstanding flanges, a bead flange extending inwardly and secured to each member and being formed to engage the axially outwardly facing portion of each bead, said members facing each other and being adapted to be clamped together, annular bases attached to said bead flanges for engaging the radially inwardly facing portion of each bead but out of contact with each other, a spacer adapted to be inserted between the inner faces of said beads above said bases, and means for heating said members for vulcanizing said beads located between said members and said bead flanges and annular bases, said heating means extending only over the bead portions of said tire.

2. Means for repairing the beads of a tire, which comprises a pair of annular outer members having upstanding flanges, a bead flange extending inwardly and secured to each member and being formed to engage the axially outwardly facing portion of each bead, said members facing each other and being adapted to be clamped together, annular bases attached to said bead flanges for engaging the radially inwardly facing portion of each bead but out of contact with each other, a spacer adapted to be inserted between the inner faces of said beads above said bases, said spacer consisting of a pair of rings in contact with each other and said bead, and means for heating said members for vulcanizing said beads located between said members and said bead flanges and annular bases, said heating means extending only over the bead portions of said tire.

3. Means for repairing the beads of a tire, which comprises a pair of annular outer members having upstanding flanges, a bead flange extending inwardly and secured to each member and being formed to engage the axially outwardly facing portion of each bead, said members facing each other and being adapted to be clamped together, annular bases attached to said bead flanges for engaging the radially inwardly facing portion of each bead but out of contact with each other, a spacer adapted to be inserted between the inner faces of said beads above said bases, said spacer consisting of a tube liner extending into the space between said beads and adapted to resist pressure, and means for heating said members for vulcanizing said beads located between said members and said bead flanges and annular bases, said heating means extending only over the bead portions of said tire.

4. Means for repairing the beads of a tire, which comprises a pair of annular outer members having upstanding flanges, a bead flange extending inwardly and secured to each member and being formed to engage the axially outwardly facing portion of each bead, said members facing each other and being adapted to be clamped together, annular bases attached to said bead flanges for engaging the radially inwardly facing portion of each bead but out of contact with each other, disks on the rim of which said members are mounted, clamping means associated with said disks to draw said members towards each other but not into contact, a spacer adapted to be inserted between the inner faces of said beads above said bases, and means for heating said members for vulcanizing said beads located between said members and said bead flanges and annular bases, said heating means extending only over the bead portions of said tire.

5. Means for repairing the beads of a tire, which comprises a pair of annular outer members having upstanding flanges, a bead flange extending inwardly and secured to each member and being formed to engage the axially outwardly facing portion of each bead, said members facing each other and being adapted to be clamped together, disks on the rim of which said members are mounted, clamping means associated with said disks to draw the same towards each other, said clamping means adapted to draw together said members, annular bases attached to said bead flanges for engaging the radially inwardly facing portion of each bead but out of contact with each other, a spacer adapted to be inserted between the inner faces of said beads above said bases, and means for heating said members for vulcanizing said beads located between said members and said bead flanges and annular bases, said heating means extending only over the bead portions of said tire.

JOSEPH HORTON-WELLINGS.

REFERENCES CITED

The following references are of record in the file of this patent:

UNITED STATES PATENTS

| Number | Name | Date |
| --- | --- | --- |
| 1,118,504 | McLeod | Nov. 24, 1914 |
| 1,357,617 | Crush | Nov. 2, 1920 |
| 1,372,799 | Cotter | Mar. 29, 1921 |
| 1,583,799 | Rutherford | May 11, 1926 |
| 1,734,766 | Fetter | Nov. 5, 1929 |

FOREIGN PATENTS

| Number | Country | Date |
| --- | --- | --- |
| 30,774 | Australia | Dec. 18, 1930 |